United States Patent [19]

Steiner et al.

[11] Patent Number: 5,350,225
[45] Date of Patent: Sep. 27, 1994

[54] ROAD VEHICLE BRAKE-PRESSURE CONTROL DEVICE

[75] Inventors: Manfred Steiner, Winnenden; Joachim Nell, Ostfildern, both of Fed. Rep. of Germany

[73] Assignee: Mercedes-Benz AG, Fed. Rep. of Germany

[21] Appl. No.: 33,757

[22] Filed: Mar. 17, 1993

[30] Foreign Application Priority Data

Mar. 17, 1992 [DE] Fed. Rep. of Germany ....... 4208496

[51] Int. Cl.$^5$ .......................... B60T 8/44; B60T 13/58
[52] U.S. Cl. .................. 303/113.4; 303/114.3
[58] Field of Search ................. 303/113.4, 114.31, 10, 303/12, 97

[56] References Cited

U.S. PATENT DOCUMENTS

| | | | |
|---|---|---|---|
| 4,057,301 | 11/1977 | Foster | 303/113.4 X |
| 4,768,841 | 9/1988 | Watanabe | 303/113.4 |
| 5,031,970 | 7/1991 | Vogel | 303/114.3 |
| 5,158,343 | 10/1992 | Reichelt et al. | 303/113.4 |

FOREIGN PATENT DOCUMENTS

| | | | |
|---|---|---|---|
| 435113 | 7/1991 | European Pat. Off. | 303/114.3 |
| 3818708 | 12/1989 | Fed. Rep. of Germany | |
| 4028290 | 1/1992 | Fed. Rep. of Germany | |
| 4102497 | 5/1992 | Fed. Rep. of Germany | |
| 2230579 | 10/1990 | United Kingdom | 303/114.3 |

Primary Examiner—Robert J. Oberleitner
Assistant Examiner—Alfred Muratori
Attorney, Agent, or Firm—Evenson, McKeown, Edwards & Lenahan

[57] ABSTRACT

In a brake-pressure control device for a road vehicle, having an antilock braking system whose braking device comprises a vacuum brake power assist unit which has a vacuum chamber connected to the intake stub of the vehicle engine and a working chamber which can be subjected to a higher pressure via a control element operable by the brake pedal, a position sensor is provided which detects the position of the brake pedal and generates output signals. An electronic control unit processes these signals and generates drive signals for a brake-pressure control device making it possible to couple into the wheel brakes a higher brake pressure than would otherwise correspond to the instantaneous pedal position. Such driving of the brake-pressure control device is triggered when the speed $\Phi$ at which the brake pedal is operated overshoots a prescribed threshold value $\Phi_S$. The brake power assist unit is provided with a solenoid valve arrangement which can be moved from a basic position in which pressure compensation can be performed between the vacuum chamber and the working chamber of the brake power assist unit, whereas the working chamber thereof can be connected only via the control element to the outside atmosphere, into a functional position in which the working chamber is subjected to the ambient pressure but is blocked off from the vacuum chamber.

12 Claims, 5 Drawing Sheets

ROAD VEHICLE BRAKE-PRESSURE CONTROL DEVICE

BACKGROUND AND SUMMARY OF THE INVENTION

The present invention relates to a brake-pressure control device for a road vehicle, having a hydraulic braking system, preferably a dual circuit braking system, and, more particularly to a brake pressure control device having a hydraulic multiple circuit braking system configured such that wheel braking is effected by operation of a brake pedal, a braking device comprising a master cylinder having output pressure chambers individually assigned to brakes and a pneumatic brake power assist unit having a vacuum chamber connected to an intake stub of a vehicle engine and a working chamber configured to be subjected, via a control element operable by the brake pedal, to a pressure higher than a pressure prevailing at the intake stub, sensor to detect a position of one of the brake pedal and an element motively coupled thereto and to generate electrical output signals characteristic of at least one of instantaneous position of the brake pedal and variations therein, and/or a force transmitter which generates output signals characteristic of a force with which a vehicle driver operates the brake pedal when braking, and an electronic control unit operatively associated with the sensor and/or the force transmitter such that, by processing signals from one of the sensor and the force transmitter, output signals are generated by the electronic control unit as drive signals for a brake-pressure control device so that, during a driving operation, a higher brake pressure than the brake pressure otherwise to be expected in accordance with the instantaneous pedal force can be coupled into individual wheel brakes, furthermore, driving of the brake-pressure control device for the purpose of increased brake-pressure deployment being triggered when at least one of a speed at which the brake pedal is operated for the purpose of a brake pressure build-up and a rate of variation of the force at which the vehicle driver operates the brake pedal is higher than a prescribed threshold value.

Provided in the foregoing type of braking system as a braking device is a master cylinder which is operable via a vacuum brake power assist unit of conventional configuration and which has output pressure chambers individually assigned in each case to the brake circuits. The pneumatic brake power assist unit has a vacuum chamber connected to the intake stub of the vehicle engine and a working chamber which is movably bounded with respect to said vacuum chamber by the working piston of the brake power assist unit and which can be subjected via a control element which performs the function of a 3/3 way control valve and is operable by the brake pedal to a pressure higher than the pressure prevailing at the output stub of the vehicle engine. As a result, the master cylinder can be operated by a force which is boosted with respect to the pure pedal force and which supports the brake pressure build-up in the wheel brakes. A displacement or position sensor is provided as an element of the brake-pressure control device to monitor the pedal position and generate electrical output signals characteristic of the instantaneous position of the brake pedal and thus also of variations therein. By the processing of these output signals there are obtained, via an electronic control unit, drive signals for a brake-pressure control device by way of which—in the event of drive—it is possible to couple into the wheel brakes a higher brake pressure than the brake pressure otherwise to be expected in accordance with the instantaneous pedal position, driving of the brake-pressure control device for the purpose of increased brake pressure deployment being triggered when the speed $\dot{\Phi}$ at which the brake pedal is operated is higher than a prescribed threshold value $\dot{\Phi}_s$. Instead of, or in combination with, monitoring the pedal position and its rate of variation, it is also possible to monitor the force $K_p$ with which the driver operates the brake pedal and its rate $\dot{K}_p$ of variation and to trigger the increased brake force deployment when the rate $\dot{K}_p$ of variation overshoots a threshold value $\dot{K}_s$. It is assumed that the vehicle is equipped with an antilock system which during braking regulates the dynamically stable deceleration behavior of the vehicle.

DE 40 28 290 C1 discloses such a brake-pressure control device required for automatic control of a method for shortening the braking distance in critical driving situations. If during pedal operation the speed threshold value $\dot{\Phi}_s$ exceeded, that known device builds up as high as possible a brake pressure in the shortest possible time as far as a brake pressure which produces full braking. The brake pressure is limited, however, by the dominant effect of the antilock system in accordance with the respectively prevailing road conditions.

The realization of this brake pressure control concept is possible, for example, by way of a brake-pressure control device which, by analogy with a traction control system (TCS) which operates in accordance with the principle of once again decelerating by automatic actuation of its wheel brake a driven vehicle wheel tending to spin, also performs this function for the wheel brakes of the non-driven vehicle wheels, when the threshold value $\dot{\Phi}_s$ of the speed is exceeded at which the driver operates the brake pedal.

Such a realization of a brake-pressure control device acting on all the wheel brakes by analogy with a TCS, which would require blocking off the brake circuits from the braking device, has the disadvantage, however, that with the onset of the automatically controlled braking operation there is a loss of any reaction of the brake pressure coupled into the wheel brakes on the brake pedal. The brake pedal would then become "hard", that is no longer capable of further depression. Thus a pedal reaction occurs which, in the case of a fair number of drivers, will give the feeling that the braking system is not in order and will then lead to an inadequate reaction of such a driver; for example, retraction of the brake pedal and subsequent renewed operation thereof because the driver suspects, for example, that "additional" brake fluid must be "pumped" or fed into the master brake cylinder, and is thus led to take measures, momentary discontinuance of braking—which would certainly be inappropriate in a traffic situation requiring full braking.

In order to avoid this disadvantage, a brake-pressure control device is described in the pending German application P 41 02 497.4-21 which is suitable for carrying out the known method and provides buffer accumulators assigned to the brake circuits. The accumulators can be connected, in a valve-controlled manner, to the pressure outputs of the braking device by an output signal of the electronic control unit which activates the brake-pressure control device. The accumulators are blocked off from the brake circuits, however, and can be recharged against a smaller restoring force than a reaction force otherwise resulting from reaction of the brake pressure on the braking device and directed against the operating force, so that during braking, bracking fluid can be displaced into these buffer accumulators from the braking device. As a result, pedal travel becomes possible and, even after the onset of the automatic brake pressure control, a pedal feeling is retained which is essentially the same as in normally occurring braking, so that the driver cannot be irritated or distracted by the automatic brake pressure control.

In the brake-pressure control device in accordance with the aforementioned Application P 41 02 497.4-21, however, the technical outlay and space required in connection with the buffer accumulators and with the solenoid valves required therefor to be coupled to and blocked off from the braking device as needed are substantial and, to this extent, disadvantageous.

A vehicle is disclosed in DE-38 18 708 A1 having a hydraulic dual circuit braking system which is operable via a vacuum brake power assist unit of special design comprising a vacuum chamber (modulation chamber), a working chamber and a simulation chamber which in the brake release position is held connected in a communicating manner to the working chamber to obtain an antilock regulating function, i.e. reducing the brake pressure, by connecting the vacuum chamber which is normally at a lower pressure than the atmospheric pressure, in a valve-controlled manner to the ambient atmosphere. Consequently, a tappet acting on the push rod piston of the master cylinder of the braking system experiences a return movement as a result of which the pressure prevailing in the master cylinder is reduced. This return movement does not lead to a reaction on the brake pedal, since the input of the pedal operating force is performed via a brake valve whose housing displacement inside a simulator housing permanently remains, due to the effect of the pressures acting in the working chamber and in the simulation chamber, in a defined basic position, against the restoring force of simulation springs, which alone determine the "pedal feeling" which is communicated to the driver as feedback on the brake pressure corresponding to his wishes.

The known braking system described in DE-38 18 708 A1 can also be utilized to realize a traction control system by arranging the simulation chamber, which is normally connected to a vacuum source, to be blocked off from the vacuum source in a valve-controlled manner independently of pedal operation of the braking system. The working chamber is subjected to the ambient pressure, as a result of which the master cylinder is operable for the purpose of brake pressure build-up. Brake-pressure reduction phases which become necessary in the course of the traction control can be controlled in a manner analogous to the antilock control operation. However, if the known braking system operation is controlled by the brake pedal, the brake pressure build-up is always performed in a manner proportional to the operating force, so that raising the brake pressure above an amount input by the driver by his or her operating force is not possible by way of this braking system. The known braking system is therefore not suitable for realizing an automatically controlled braking operation in which, in an introductory phase of braking, a brake pressure deployment disproportionately increased with respect to the operating force is possible.

It is therefore, an object of the present invention to provide a brake-pressure control device which is suitable for carrying out the known method; facilitates, in conjunction with a nevertheless simple and cost-effective design, control in accordance with the method of an automatic braking operation in connection with a high vehicle deceleration; and thereby produces a pedal reaction largely corresponding to the accustomed pedal travel/brake force correlation.

The foregoing object has been achieved according to the present invention by providing the vacuum brake power assist unit includes a solenoid valve arrangement driven by one of the electrical output signals of the electronic control unit and movable from a basic position, in which a control duct of the control element, via which pressure compensation can be performed between the vacuum chamber and the working chamber of the vacuum brake power assist unit, is communicatingly connected to the vacuum chamber, whereas the working chamber of the vacuum brake power assist unit is blocked off from the outside atmosphere, into an excited functional position in which the control duct of the brake power assist unit is subjected to the ambient pressure via a flow path of the solenoid valve arrangement that is released in the functional position, whereas the control duct is blocked off from the vacuum chamber, the basic position of the solenoid valve arrangement being assigned to a non-operated state of the braking system and to the target braking operation thereof and the valve arrangement passing into its excited position when, during operation of the brake pedal, at least one of the threshold value of the rate of operation and the threshold value of the rate of variation of the operating force is overshot, and a valve is operatively associated to respond to the pressure in the control duct, is subjected to an opening direction to a relatively higher pressure in the control duct than in the working chamber and is otherwise blocked, and via which the control duct can be connected directly to the working chamber of the vacuum brake power assist unit.

A solenoid valve arrangement is provided as an auxiliary device on the vacuum brake power assist unit. When driven by the output signal of the electronic control unit which is characteristic of the rapid operation of the brake pedal, the solenoid valve arrangement can be switched over from a basic position, which is assigned to the non-operated state of the braking system and to the soft target braking operation thereof and in which a control duct of the control element of the brake power assist unit, via which pressure compensation can be performed between the vacuum chamber of the latter and its working chamber, is connected in a communicating manner to the vacuum chamber. The working chamber of the brake power assist unit is blocked off from the outside atmosphere, into an excited functional position which is assigned to the automatically controlled full braking and in which the control duct of the brake power assist unit is subjected to the ambient pressure via a flow duct of the solenoid valve arrangement that is released in this functional position, whereas the control duct is blocked off from the vacuum chamber of the brake power assist unit. By way of this solenoid valve arrangement, the accustomed pedal feedback is obtained due to the fact that the vacuum brake power assist unit is utilized during automatically controlled full braking in order to operate the master cylinder, with a drastically increased boost factor, at least to the extent that the brake pedal can at least follow up the brake power assist unit piston independently of which force has to be expended for this purpose by the driver. Thus, a pedal travel/vehicle deceleration correlation of an accustomed type is retained and the driver cannot be irritated or confused.

A valve which responds to the pressure in the control duct is pressurized in the opening direction by pressure in the control duct which is relatively higher than in the working chamber, is otherwise blocked and can directly connect the control duct to the working chamber. It is possible for this valve to be constructed as a check valve, and in a preferred configuration as a simple flutter valve, which sealingly covers the discharge opening of a transverse duct, which originates from the control duct and discharges into the working chamber, as long as the pressure in the working chamber is higher than in the control duct and, in a special configuration, is formed by an elastomeric lip which, subjected to moderate biasing covers the discharge opening of the transverse duct on the drive side. By way of this valve, it is possible for the control duct of the control element of the brake power assist unit to be connected directly to the working chamber thereof even if the control element, which in accordance with its function is a 3/3 way control valve having two alternative flow positions and one blocked position, is in the blocked position, which is adopted during normal braking when the driver no longer depresses the brake pedal upon the achievement of a desired vehicle deceleration. A desired rapid response of braking with a high boost factor at the onset is achieved by virtue of this valve, especially at the start of automatically controlled braking.

The brake-pressure control device according to the present invention can be realized by two 2/2 way solenoid valves, one of which provides in its excited position a direct connection between the working chamber and the outside atmosphere and is otherwise blocked, and the other of which provides in its basic position the connection between the control duct and the vacuum chamber and interrupts the connection in its excited position. It is possible for the first of these two valves to be arranged "outside" the brake power assist unit, and for the second to be integrated into the control element housing, which can be moved together with the working piston of the brake power assist unit.

From the foregoing, it should now be apparent that the technical outlay to be made for the brake-pressure control device according to the present invention corresponds at most to that which is necessary in the case of the brake-pressure control device according to the aforementioned German Patent Application P 41 02 497.4-21 merely for the connection control of the buffer accumulators further provided there, which control device is realized by 3/3 way solenoid valves.

Although flexible electrical supply lines and electrically insulating housing bushings are necessary for a solenoid valve integrated into the movable control element housing, the additional outlay in this regard is insubstantial compared with realizing the brake-pressure control device as provided in accordance with the German Patent Application P 41 02 497.4-21.

The only problem that could arise is the spatial arrangement of a valve, integrated into the control element, "inside" the brake power assist unit, which to this extent would require a design modification. However, outlay in this regard can be largely avoided, at least reduced, by leading the control duct to the outside via a flexible line and a bushing of the housing and arranging outside the vacuum chamber of the brake power assist unit a solenoid valve which in its basic position connects the bushing to a second bushing leading back into the vacuum chamber, and in its excited position adopted during driving by way of an output signal of the control device blocks off the first bushing from the second and in return connects the latter to the space outside the brake power assist unit, which is at atmospheric pressure. In such a configuration of the solenoid valve arrangement as a 3/2 way valve and arrangement of the latter "outside" the vacuum chamber of the brake power assist unit, only one valve is required, whose control current supply can also be performed via fixed electrical lines. When compared with a conventional vacuum brake power assist unit, the supplement, required to match the vacuum brake power assist unit to the brake-pressure control device according to the invention, of a flexible aerial line leading from the control duct to a first bushing of the vacuum housing, and of a second bushing, between which the brake-pressure control valve arranged outside the vacuum housing is inserted, entails only a small extra outlay and can therefore be realized cost-effectively.

It is especially advantageous when the brake-pressure control valve is constructed as a 3/3 way valve which by means of control signals of defined different control current strengths can be moved into its functional position II, which connects the control current duct to the outside atmosphere, and into a functional position I which blocks the control duct off from both bushings. It is possible to utilize the blocked position especially advantageously to control brake-pressure reduction phases in the course of which the brake-pressure control valve is switched over repeatedly between its basic position and the blocked position.

If, as provided in a preferred embodiment of the brake-pressure control device, the working chamber of the brake power assist unit can be subjected to a pressure higher than the atmospheric ambient pressure, the higher pressure being between approximately 1.5 and 2.5 (and preferably approximately 2 bars), it is possible to achieve increased braking forces during automatically controlled braking. An increase in the control point of the brake power assist unit is therefore achieved even during normal braking, when in this case the pump is activated. That is, it is possible to achieve relatively high braking forces via operating forces that are still relatively low.

In a simple embodiment that is advantageous in terms of circuitry, the pressure outlet of the compressed-air pump provided for the provision of the higher pressure is connected to the input, connected to the working chamber of the brake power assist unit during full braking, of the brake-pressure control valve via a first check valve which in the opening direction is subjected to relatively higher pressure at the pressure outlet of the pump than in the working chamber and is otherwise blocked. A second check valve is connected to the pressure inlet of the brake-pressure control valve and, in the event of relatively higher pressure at the pressure inlet of the brake-pressure control valve, is blocked and is otherwise open, so that the atmospheric pressure can be coupled into the working chamber of the brake power assist unit via the second check valve should the pump have failed.

BRIEF DESCRIPTION OF THE DRAWINGS

These and other objects, features and advantages of the present invention will become more apparent from the following detailed description when taken in conjunction with the accompanying drawings wherein.

DETAILED DESCRIPTION OF THE DRAWINGS

Figure 1:
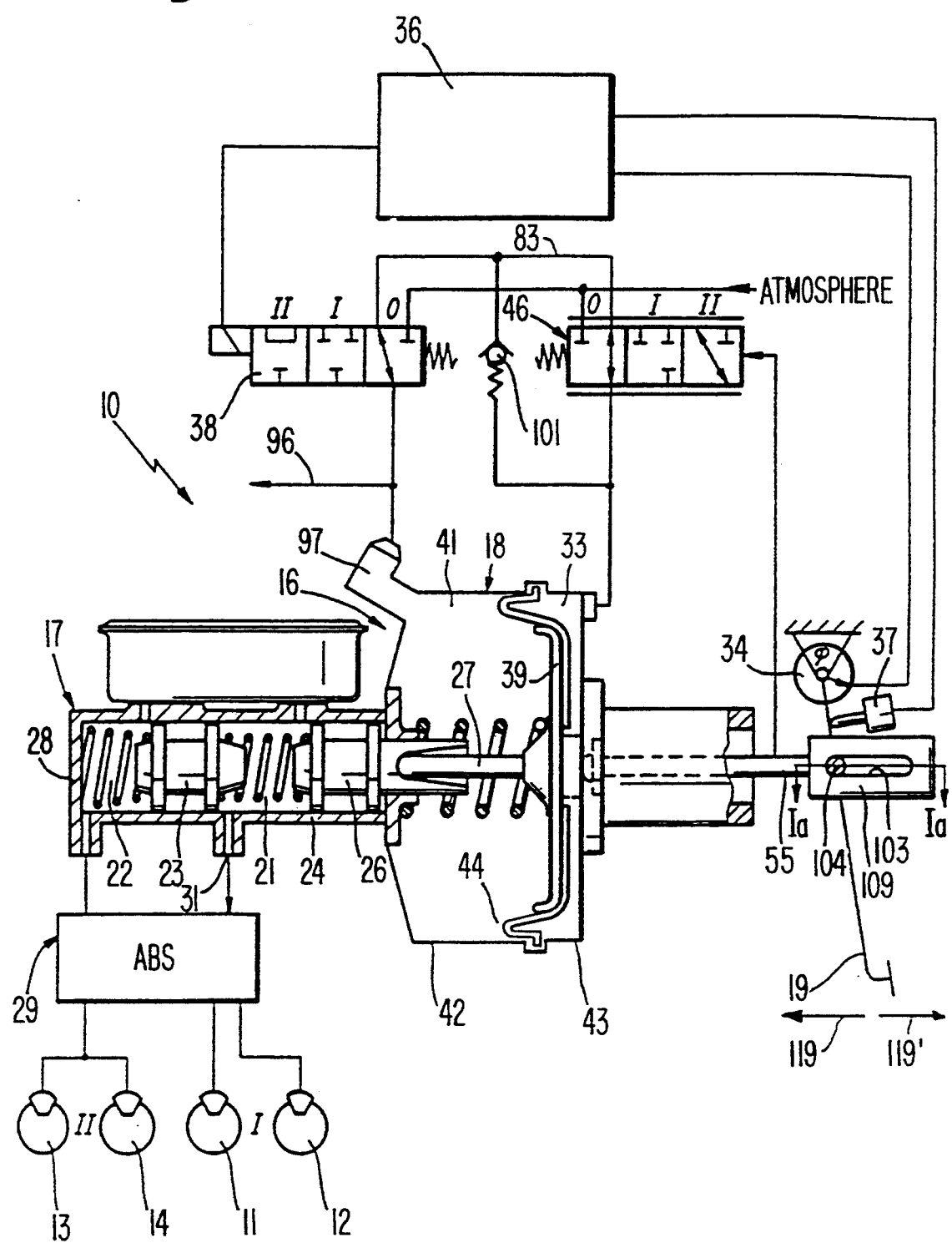
FIG. 1 is a schematic electrohydraulic diagram of a hydraulic dual circuit braking system, operable via a vacuum brake power assist unit, of a road vehicle which is equipped with an antilock system and a brake-pressure control device according to the present invention.

In FIG. 1, numeral 10 generally denotes a hydraulic dual circuit braking system of a road vehicle in which a brake-pressure control device according to the present invention is integrated and whose aim is to recognize from the way in which the driver operates the braking system 10 whether the driver wishes to carry out target braking, which can be carried out with moderate vehicle deceleration, or full braking with as high as possible a vehicle deceleration and, in the latter case, automatically to control the deployment of a suitable, high braking force which the driver could not control, at least not quickly enough, purely by operating the braking system 10, that is to say without the braking-force control device.

In the braking system 10, the front wheel brakes 11, 12 are combined to form a front axle brake circuit I, and the rear wheel brakes 13, 14 are combined to form a rear axle brake circuit II. The braking device of the braking system 10, denoted overall by numeral 16, comprises a tandem master cylinder 17 and a vacuum brake power assist unit 18, and is operable by way of a brake pedal 19 through which the vehicle operator inputs the vehicle deceleration corresponding to his or her intent during braking. The tandem master cylinder 17 has a primary output pressure chamber 21 assigned to the front axle brake circuit I and a secondary output pressure chamber 22 assigned to the rear axle brake circuit II, which are bounded with respect to one another in an axially movable and pressure-tight fashion by a floating piston 23. The second axial boundary of the primary output pressure chamber is formed by a primary piston 26 which is axially movable in a pressure-tight manner in the master cylinder housing 24 and on which the operating force boosted by the vacuum brake power assist unit 18 acts via a push rod 27, while the second axial boundary of the secondary output pressure chamber 22 is formed by an end wall 28 of the master cylinder housing 24.

Furthermore, it is assumed that the vehicle is equipped with an antilock system of a conventional configuration and a function, which during braking—in case of need—performs a brake pressure control which is consistent with dynamically stable behavior of the vehicle and also leads to an optimum, or at least approximately optimum vehicle deceleration. The antilock system is represented in FIG. 1 by diagrammatically indicated brake-pressure control valves and, if necessary, by the hydraulic unit 29 which comprises return pumps individually assigned to the brake circuits I and II and is inserted in an operative sense between the pressure outlets 31, 32 of the tandem master cylinder 17, which outlets are assigned to the two brake circuits I and II, and the front axle brakes 11, 12 or the rear axle brakes 13, 14. An explanation of this antilock system 29, which can be realized in known way from conventional antilock system technology, (the details of which are unnecessary to understand the present invention) since basically any type of antilock system is suitable in conjunction with the brake-pressure control device of the present invention).

The control principle which finds application in the brake-pressure control device of the present invention consists in detecting from continuous monitoring of the position of the brake pedal 19 the speed with which the driver operates the brake pedal 19. If this speed overshoots an expediently settable, prescribed threshold value $\Phi_s$, from which it can be deduced that the driver intends to carry out not merely considered target braking but full braking, the control principle activates the brake power assist unit 18 by automatic, valve-controlled pressurizing of its working chamber 33 by way of the ambient pressure (atmospheric pressure) and thereby brings the braking force which can be deployed via the wheel brakes 11 to 14 to a value as high as possible at as early as possible an instant in the course of braking, and limits the value, if necessary along with the action of the antilock system 29, to ensure the dynamically stable deceleration behavior of the vehicle.

In order to realize this brake-pressure control concept, provision is made for a pedal position sensor 34 which is constructed as a phase-angle sensor in the illustrated embodiment and generates electrical output signals which are in each case a measure of the instantaneous position of the brake pedal 19.

Such a phase-angle sensor can be constructed in a simple configuration, for example as a rotary potentiometer which, with increasing deflection of the brake pedal 19 from its basic position corresponding to the disconnected state of the braking system 10, generates a voltage output signal increasing in level, which can be evaluated by an electronic control unit 36 in units of pedal position $\Phi$ and the temporal variation $\dot{\Phi}$ thereof. The pedal position sensor can also be constructed in known technology as a "digital" incremental sensor which generates pulse chains linked to incremental variations $\delta\Phi$ in the pedal position, from whose phase angle and pulse number it is possible to determine the sense of variation and magnitude of the pedal position. The pedal position sensor can also be constructed as an absolute sensor operating in a suitable digital output format.

In the electronic control unit 36, which is activated by operation of the braking system 10, for example by a voltage signal which is linked to the response of the stop lamp switch 37 and is applied for the duration of the braking operation, the output signals of the pedal position sensor 34 are subjected to a process of time differentiation, that is to say from the start of the braking system 10 the speed $\dot{\Phi}$ is determined with which the brake pedal 19 is "depressed" by the driver, and if this speed $\dot{\Phi}$ is higher than an expediently settable prescribed threshold value $\dot{\Phi}_s$ the electronic control unit 36 transmits an output signal for driving a brake-pressure control valve 38, which is constructed as a solenoid valve and is hereby switched into a functional position II in which the atmospheric pressure is coupled into the working chamber 33 of the vacuum brake power assist unit 18 and the latter is thereby driven to deploy its maximum operating force, which is transmitted via the push rod 27, rigidly connected to the working piston 39, of the brake power assist unit 18 onto the primary piston 26 of the tandem master cylinder 17.

In the embodiment of FIG. 1, the vacuum brake power assist unit 18, whose purpose can be explained by reference more detailed to FIGS. 2a to 2c, corresponds with respect to the design configuration of a vacuum housing 42, which bounds the vacuum chamber 41 in a manner fixed to the housing, a vacuum cylinder 43, which bounds the working chamber 33 in a manner fixed to the housing, a construction and arrangement of its working piston 39, which movably bounds the vacuum chamber 41 with respect to the drive chamber 33, a rolling diaphragm 44, which seals the piston 39 with respect to the two chambers 33 and 41, a control element, which is denoted overall by numeral 46 and via which a working pressure that is proportional to the force with which the driver operates the brake pedal 19 and in terms of magnitude lies between the atmospheric pressure and the vacuum prevailing in the vacuum chamber 41, can be coupled into the drive chamber 33, a configuration of a reaction member 47, which is constructed as a simple lever mechanism and determines the magnitude of the reaction force which is detectable at the brake pedal 19 and against which the driver has to operate the brake pedal 19 for the purpose of brake pressure build-up, as well as to the mechanical and functional connection of the brake power assist unit 18 to the tandem master cylinder 17, to a conventional brake power assist unit such as is represented and explained in detail, for example, in "Bremsen-Handbuch" ("Brake Manual"), Alfred Teves GmbH, 9th edition, Bartsch Verlag, pages 100, 101.

Accordingly, the control element 46, which is represented in the equivalent circuit diagram of FIG. 1 by the hydraulic circuit symbol, is constructed as a 3/3 way proportional valve whose housing 48 has a radial flange 49 which forms the central region of the working piston 39 of the vacuum brake power assist unit 18. Adjoining this radial flange 49 is a housing part 51, which axially penetrates the drive chamber 33, has a tubular basic shape and passes through a central opening 52 in the vacuum cylinder 43, is guided in a slidingly displaceable manner therein, and is connected in an air-tight fashion to the vacuum cylinders 43 by an external bellows seal 53.

The housing part 51 of the housing 48 of the control element 46 forms with its radial flange 49, the central part of the working piston 39 of the vacuum brake power assist unit 18 and has a central through bore 56, which is coaxial with the central longitudinal axis 54 of the braking device 17. The push rod 27 and the pedal tappet 55 axially penetrating the tubular housing part 51 extend through the central bore 56. The tappet deviates slightly herefrom depending on the pedal position. In the central bore 56, is arranged displaceably in a pressure-tight manner a reaction piston 57 on whose side facing the push rod 27 of the brake power assist unit 18 the reaction member 47 acts. Under the action of the reaction and/or restoring forces, acting via the push rod 27 in the direction of the arrow 58 in FIG. 2a, of the restoring springs arranged in the tandem master cylinder 17, the reaction member 47 tends to displace the reaction piston 57 into its end position, which projects on the pedal side furthest from the central through bore 56, corresponds to the non-operated state of the braking system 10, is represented in FIG. 2a, and in the illustrated embodiment is marked by radial contact of a reaction lever 59 of the reaction member 47 on the radial end face 61 of the housing 48, which faces a support plate 62 of the push rod 27. As a result, the push rod 27 is shackled by a shackle sleeve 63 to the working piston 39 of the brake power assist unit 18, and via which the reaction forces acting in the direction of the arrow 58 are also transmitted to the reaction member 47. A support member 64 is arranged between the outer rim of the support plate 62 and the radially external region of the reaction lever 59 and has radial dimensions and arrangement which determine the ratio of the effective lever arm lengths of the reaction lever 59 by which the reaction force perceptible at the brake pedal 19 is less than the reaction force which can be introduced into the reaction member 47 during braking via the push rod 27. This ratio also prescribes the force transmission factor of the brake power assist unit 18.

The through bore 56 also opens on the pedal side into a bore step 66, which is somewhat larger in terms of diameter, of an intermediate section 51' of the control element housing 48. The intermediate section 51' is provided with a radial duct 67 via which said bore step 66 communicates with the working chamber 33.

A radial, annular step face 69 is provided between the bore step 66 of the intermediate section 51' and the bore step 68, adjoining on the pedal side, of the tubular housing part 51 of the control element housing 48. Arranged inside the bore step 68 of the tubular housing part 51 is a step bellows 71, which consists of elastic sealing material. The step bellows 71 bears with a circularly cylindrical circumferential section 72 on the pedal side against the bore surface of the bore step 68, and has an internal, circularly cylindrical circumferential section 74 which is connected to the external circumferential section 72 via a radial web 73 and points towards the bore 66 of the intermediate section 51. The inside diameter of the section 74 corresponds approximately to the diameter of the central bore step 66 of the housing intermediate section 51', and its outside diameter is somewhat larger than the diameter of the bore step 66.

On the end of the internal circumferential section 74 which faces the radial step face 69 of the housing 48, the step bellows 71 has the form of an inwardly open U-profiled ring 76 in which there is inserted for the purpose of reinforcement a steel washer 77 which has a central opening 78 through which the conical end section of the pedal tappet 55 passes. The tappet 55 acts with its spherical head end, which is accommodated by a short blind bore of the reaction piston 57, directly on the reaction piston 57.

The end flange of the step bellows 71, which is formed by the U-profiled ring 76 of the step bellows 71 and the reinforcement washer 77 inserted therein, is pressed by a biased spring 79, which is supported axially on a ring shoulder of the pedal tappet 55 and acts on the outside surface of the end flange 76, 77 facing the pedal tappet 55. The spring 79 biases the bellows 71 towards the radial step face 69 of the housing 48 which forms the seating surface of a radially external seating valve denoted overall by numeral 81 and in whose closed state, shown in FIGS. 2b and 2c, an annular space 82 bounded by the step bellows 71 and the section of the bore step 68 adjoining the step face 69 is blocked off from the bore step 66 of the housing intermediate section 51' and thus also from the working chamber 33 of the vacuum brake power assist unit 18.

Figure 2A:
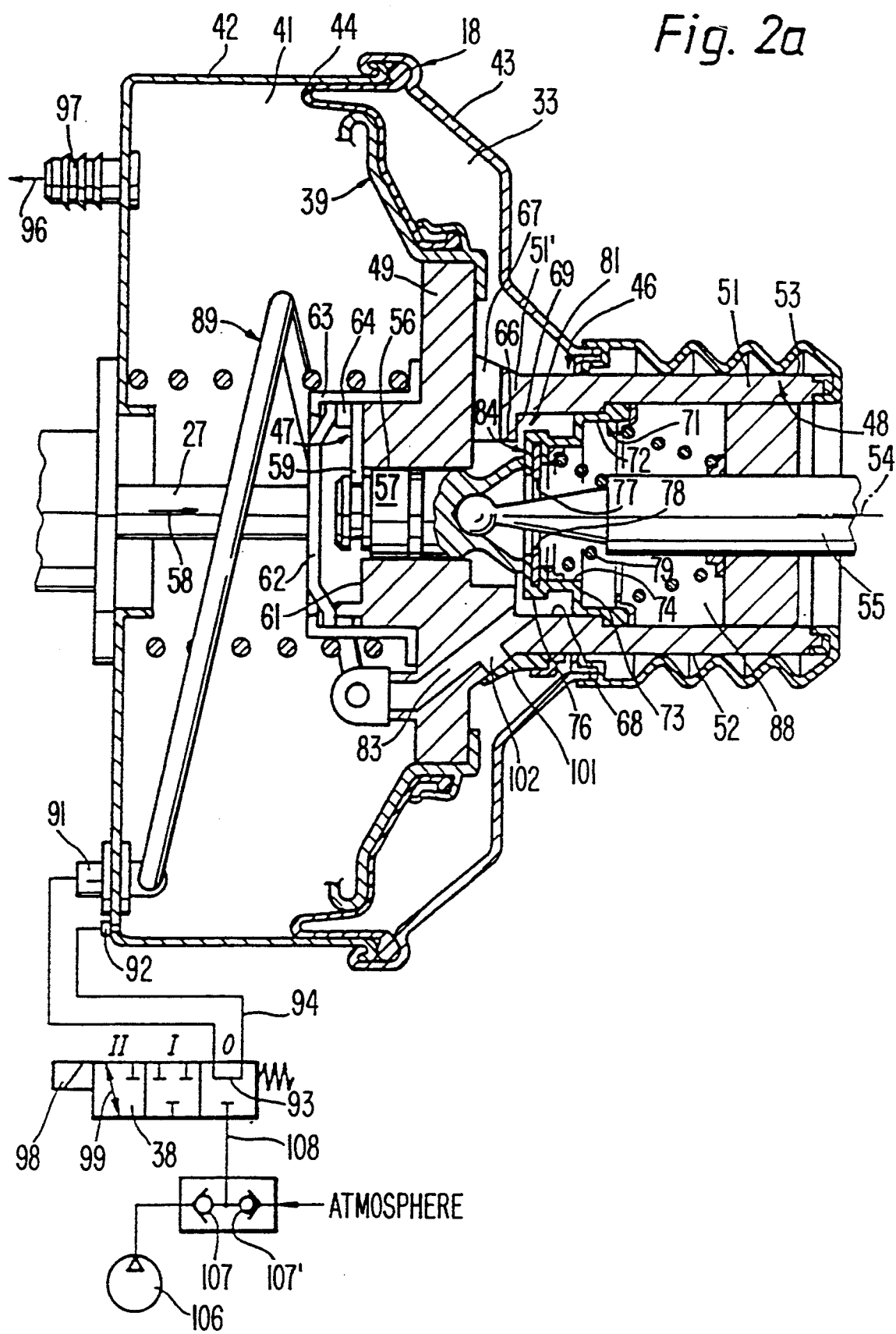
FIGS. 2a to 2c are detailed cross-sectional views illustrating the function of the vacuum brake power assist unit of the braking system in accordance with FIG. 1.

In this closed position of the external seating valve 81, there is also blocked off from the working chamber 33 a control duct 83 via which the chamber 33 is connected, for example in the open position, shown in FIG. 2a, of the external seating valve 81 and if the brake-pressure control valve 38 is simultaneously in its illustrated basic position 0, to the vacuum chamber 41 of the brake power assist unit 18. In a conventional configuration of the brake power assist unit 18, the annular space 82 is connected directly to the vacuum chamber 41 via the control duct 83.

A second radially internal seating valve, denoted overall by numeral 84, is formed as a valve body by an extension 86 of the reaction piston 57, which extension has the shape of the circumference of a bell or cone and coaxially surrounds the conical section of the brake pedal tappet 55 on a section of its length at a radial distance, and, as valve seat, by the radially internal region, facing the valve body, of the end flange of the step bellows 71 formed by the U-profiled ring of the step bellows 71 and the reinforcement washer 77 thereof. The circular free rim of the extension 86 of the reaction piston 57 can be supported on the valve seat so as to bear in a pressure-tight fashion.

In the basic position of the control element 46, corresponding to the non-operated state of the braking system 10 shown in FIG. 2a (to which corresponds in FIG. 1 the basic position 0 of the 3/3 way control valve representing the control element 46 as an equivalent circuit diagram), the internal seating valve 86 is closed. Thus, the ambient pressure interior 88 of the tubular housing part 51 of the control element 46 is blocked off from the working chamber 33 of the brake power assist unit 18. Meanwhile, the external seating valve 81 adopts its open position since, as a consequence of the restoring force of one or more restoring springs of the tandem master cylinder 17 exerted on the push rod 27 and via the latter on the reaction member 47 and by the latter on the reaction piston 57, the reaction piston 57 adopts its end position corresponding to the largest possible axial distance of the free rim 87 of its valve body extension 86 from the plane of the step face 69, forming the valve seat of the external seating valve 81, of the housing 48, in which end position the valve body, formed by the end flange of the step bellows 71, of this external valve seat 81 is raised from its valve seat 69.

Figure 2B:
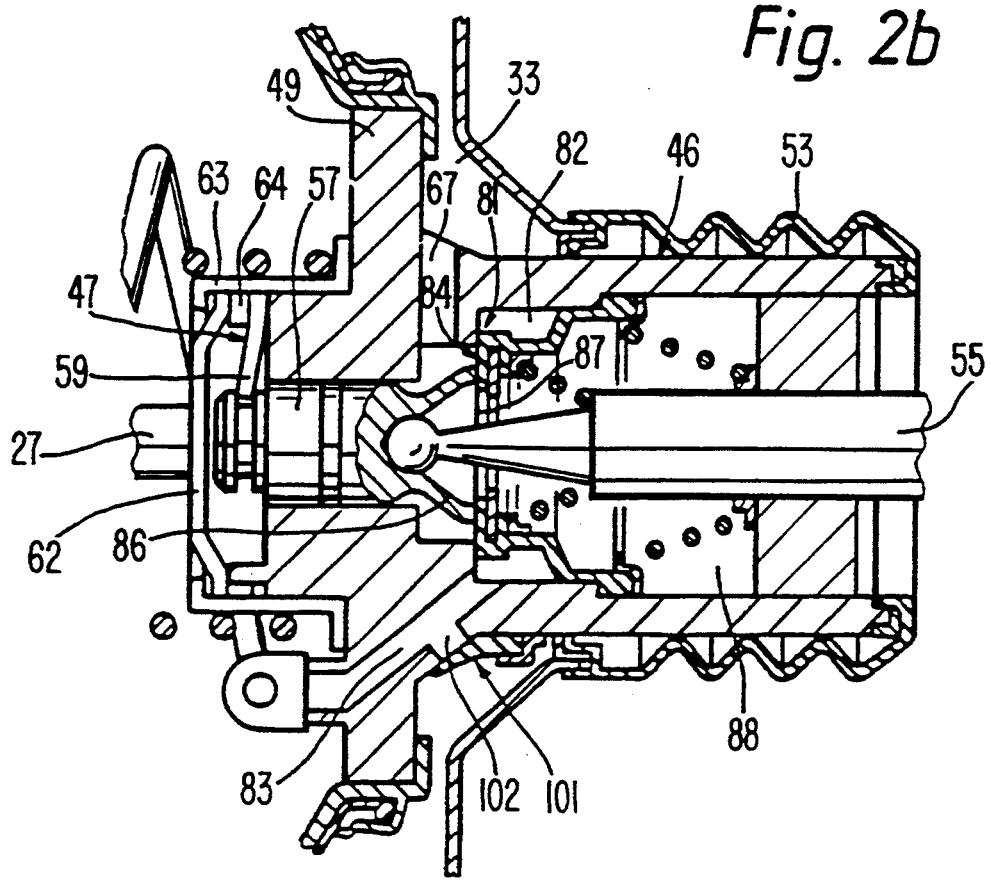
Figure 2C:
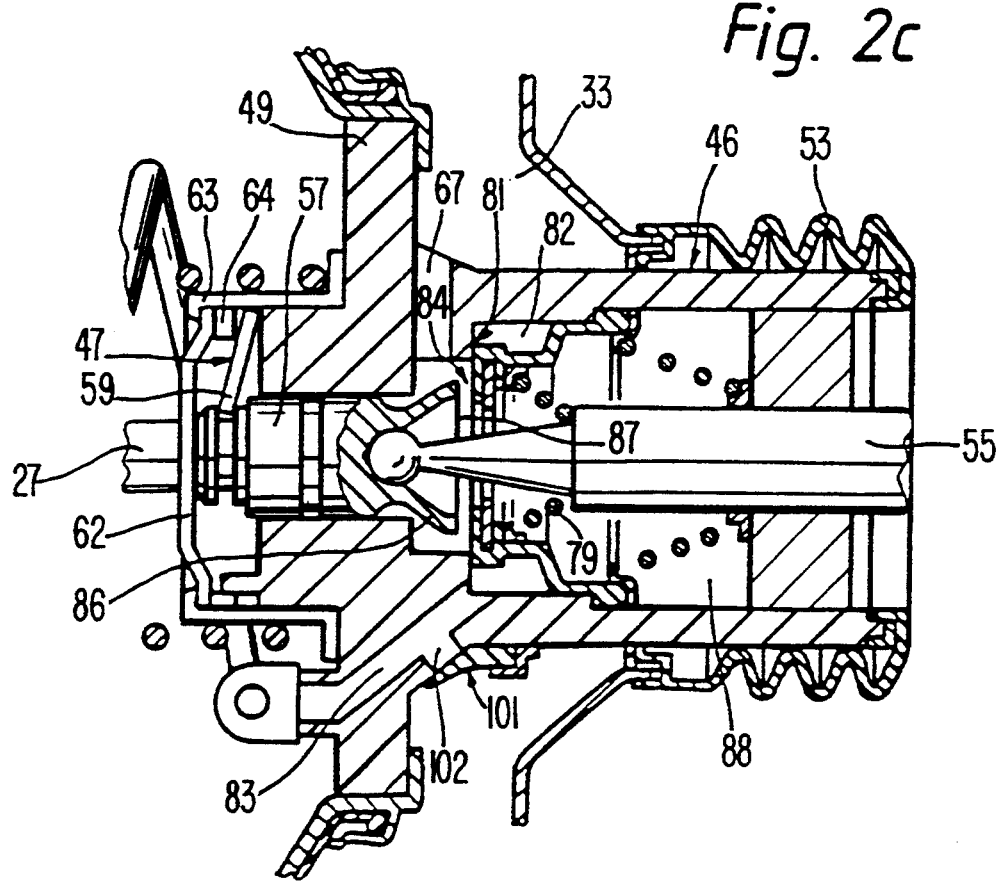

The functional position of the control element 46 shown in FIG. 2c in which the radially external seating valve 81 is closed and the radially internal seating valve 84 adopts its open position, in which the working chamber 33 is at atmospheric pressure, is adopted when the driver operates the brake pedal 19 so strongly that the free rim 87 of the valve body extension 86 of the reaction piston 57 remains raised from the internal rim (forming the valve seat of the internal seating valve 84) of the end flange 76, 77 of the step bellows 81. That is, the driver operationally holds the brake pedal 19 with a force sufficient to achieve full braking. This functional position corresponds in the equivalent circuit diagram of FIG. 1 to the functional position II of the 3/3 way control valve 46.

The functional position of the control element 46 shown in FIG. 2b in which both seating valves 81 and 84 are closed, is achieved in the course of a "carefully" performed target braking when, after a "slow" rise, initiating braking, in the pedal operating force, the driver holds the latter constant as soon as the vehicle deceleration thereby achieved seems sufficient to him, resulting as an equilibrium position in the blocked position which is represented in FIG. 2b and corresponds to holding constant a pressure which is coupled into the working chamber 33 and correlated with a value of the braking pressure determined by the design of the braking system. This functional position of the control element 46 corresponds to the blocked position I of the schematic valve 46 in the equivalent circuit diagram of FIG. 1.

In contrast to a conventional vacuum brake power assist unit, in which the control duct 83 is permanently connected in a communicating fashion to the annular space 82 of the control element 46 and opens directly into the vacuum chamber 41, the vacuum brake power assist unit 18 of the present invention is provided for the braking system 10 in accordance with FIG. 1 and, as shown in more detail in FIG. 2a, has a control duct 83 connected via a flexible line 89, which is leakproof with respect to compressed air, to an equally leakproof bushing 91 of the vacuum housing 42. In turn, the bushing 91 can be connected, via the brake-pressure control valve 38, to an inlet stub 92 of the vacuum housing 42, as a result of which it is possible to achieve the communicating connection of the control duct 83 to the vacuum chamber 41 that is necessary or a "careful" target braking operation. This "normal" braking operation is assigned the basic position 0 of the brake-pressure control valve 38, in which the bushing 91 is connected via a flow path 93 of the brake-pressure control valve 38 to the inlet stub 92. As shown in FIG. 2a, the airflow path 94 leading from the brake-pressure control valve 38 to the inlet stub 92 could also be directly connected to the vacuum line 96 which leads to the intake stub of the vehicle engine and is permanently held via the connecting stub 97 in communicating connection to the vacuum chamber 41.

The brake-pressure control valve 38 is constructed as a 3/3 way solenoid valve which upon excitation of its control magnet 98 by way of a control current of defined, relatively low current strength of, for example, 3A is switched over into its functional blocking position I and upon excitation of the control magnet 98 by way of a control current of defined, higher current strength of, for example, 6A is switched over into its functional position II in which the atmospheric pressure can be coupled via the flow path 99 into the working chamber 33 of the brake power assist unit 18 via the flexible line 89 and the control duct 83. At that time, the vacuum chamber 41 of the brake power assist unit 18 is blocked off from the flexible line 89, so that pressure compensation cannot take place between the working chamber 33 and the vacuum chamber 41. In order to ensure that the atmospheric pressure, if necessary even a higher pressure, can be coupled via the brake-pressure control valve 38 and the flexible line 89 as well as the control duct 83 into the working chamber 33 of the brake power assist unit 18, even if the external seating valve 81 is in its blocked position, a check valve 101 is provided which releases an overflow duct 102, which leads directly to the working chamber 33 from the control duct 83 which is represented in the equivalent circuit diagram of FIG. 1 by a connecting line which provides the series connection of the brake-pressure control valve 38 and the control element 46 and is likewise denoted by numeral 83, when the pressure in the control duct 83 is higher than in the working chamber 33, and holds the overflow duct 102 blocked off when the pressure in the working chamber 33 is higher than in the control duct 83, as is required for the case of a "soft" target braking.

The blocked position I of the brake-pressure control valve 38 can be utilized, for example, by repeated switching over between the blocked position I and the basic position 0 of the brake-pressure control valve 38, to achieve a desired brake-pressure reduction rate. This desired rate is expedient, for example, if, after the driver has initiated full braking by a short rapid touch on the brake pedal 19, the driver should instead wish to discontinue the full braking and by "slowly" retracting the brake pedal 19 reduce the braking force correspondingly slowly.

The driver's wish once again to discontinue—active—full braking initiated as explained above by rapid operation ($\dot{\Phi} > \dot{\Phi}_s$) of the brake pedal 19 can also be detected by monitoring the pedal position $\Phi$ and its sense of variation, which can then be detected especially easily by differentiating the output signal of the pedal position sensor 34 when it varies monotonically with the pedal position $\Phi$, for example with increasing pivoting of the brake pedal 19 in the direction of the arrow 119. That is, in the sense of a rise in brake pressure, the signal level rises, and falls again when the brake pedal 19 is retracted in the direction of the arrow 119' in FIG. 1.

Detecting a driver's wish in this regard can also be performed by detecting movements of the brake pedal 19 relative to the pedal tappet 55 or to a coupling element 109 which also executes the movements thereof. The possibility of such relative movements between the brake pedal 19 and the pedal tappet is indicated in a diagrammatically simplified manner in FIGS. 1 and 1a by constructing the pedal-side end of the pedal tappet 55 as a U-profiled coupling element 109 having profile limbs 109', 109" which extend parallel to the pivoting plane of the brake pedal 19 and are provided with mutually aligned elongated holes 103 which extend in the axial direction. A transverse bolt 104 passes through the holes 103 and is at its center is connected to the brake pedal 19 so that, in conjunction with the support of the bolt 104 on the tappet-side rims of the elongated holes 103, the pedal operating force can be transmitted to the pedal tappet 55. The transverse bolt 104 can be displaced in a sliding fashion in the elongated holes 103, so that when the brake pedal 19 is rapidly retracted it can be raised from the tappet-side rims of the elongated holes 103 and slide back inside the latter. The coupling element can also be raised from the transverse bolt 104 when full braking is initiated and the brake pedal 19 follows up the brake pressure buildup movement of the pedal tappet 55 more slowly than the movement thereof is performed under the action of the pressure coupled into the working chamber 33 of the brake power assist unit 18.

The driver's wish to hold the brake pressure constant can be detected from the lack of variation ($\dot{\Phi} = 0$) in the output signal of the pedal position sensor 34.

Figure 1A:
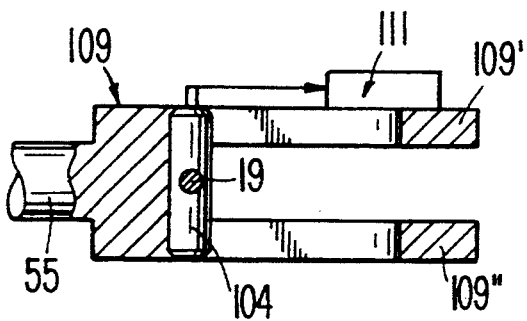
FIG. 1a is a cross-sectional view along the line Ia—Ia of FIG. 1 for the purpose of explaining a variant of the sensor arrangement.

If, as indicated schematically in FIG. 1a, the fork-shaped coupling element 109 is provided with a relative movement sensor 111 which, with increasing distance of the transverse bolt 104 from its tappet-side bearing position with the end rims, facing the pedal tappet 55, of the elongated holes 103, generates a monotonically varying output signal, or is simply constructed as a circuit element which transmits an output signal starting from a minimum distance of the transverse bolt 104 from the bearing position, it is also possible for such output signals of a relative position sensor 111 to be utilized analogously to detect the driver's wish that full braking is to be discontinued.

Figure 1B:
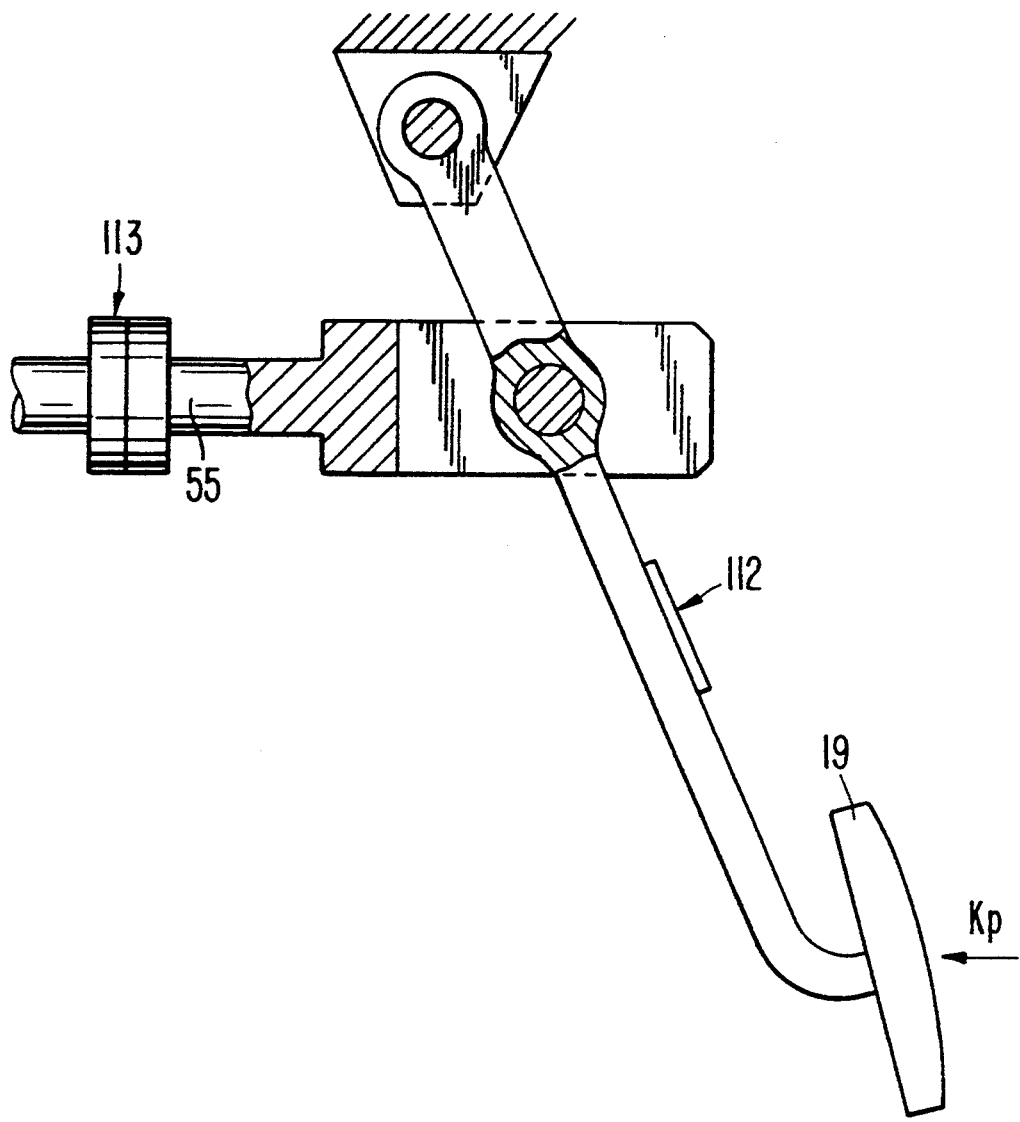
FIG. 1b is an enlarged, partial cross-sectional view of possible arrangements of force sensors for explaining a further embodiment of a brake-pressure control device according to the present invention.

Force sensors 112 and/or 113 which generate electrical output signals characteristic of the force $K_p$ with which the driver operates the brake pedal 19 and are also indicated schematically in FIG. 1b are suitable for detecting the driver's wish and can be utilized for the purpose of brake pressure control which is automatic in the sense explained above and produces an increased or "normal" brake pressure development appropriate to the situation.

In the illustrated embodiment of FIG. 1b, there is no need for elongated holes corresponding functionally to the elongated holes 103 of the coupling member 109 of the pedal tappet 55 in accordance with FIG. 1. The force sensors can be constructed, for example as shown in FIG. 1b, as strain gauge arrangements 112 arranged on the brake pedal 19 itself which respond to deflections of the brake pedal 19, or as load cells 113 which can be realized by pressure-dependent resistance elements or piezoelectric materials which generate electrical output signals characteristic of the forces acting axially on the pedal tappet 55. In order to explain a simple evaluation principle with the aid of which it is possible by means of the force sensor output signals to detect the driver's wish, e.g. full braking or target braking, it may be assumed by way of simplification that the output signal of the respective force sensor 112 or 113 is a voltage signal whose level increases with increasing force $K_p$ by virtue of which the driver operates the brake pedal 19, and is proportional to the force.

Figure 1C:
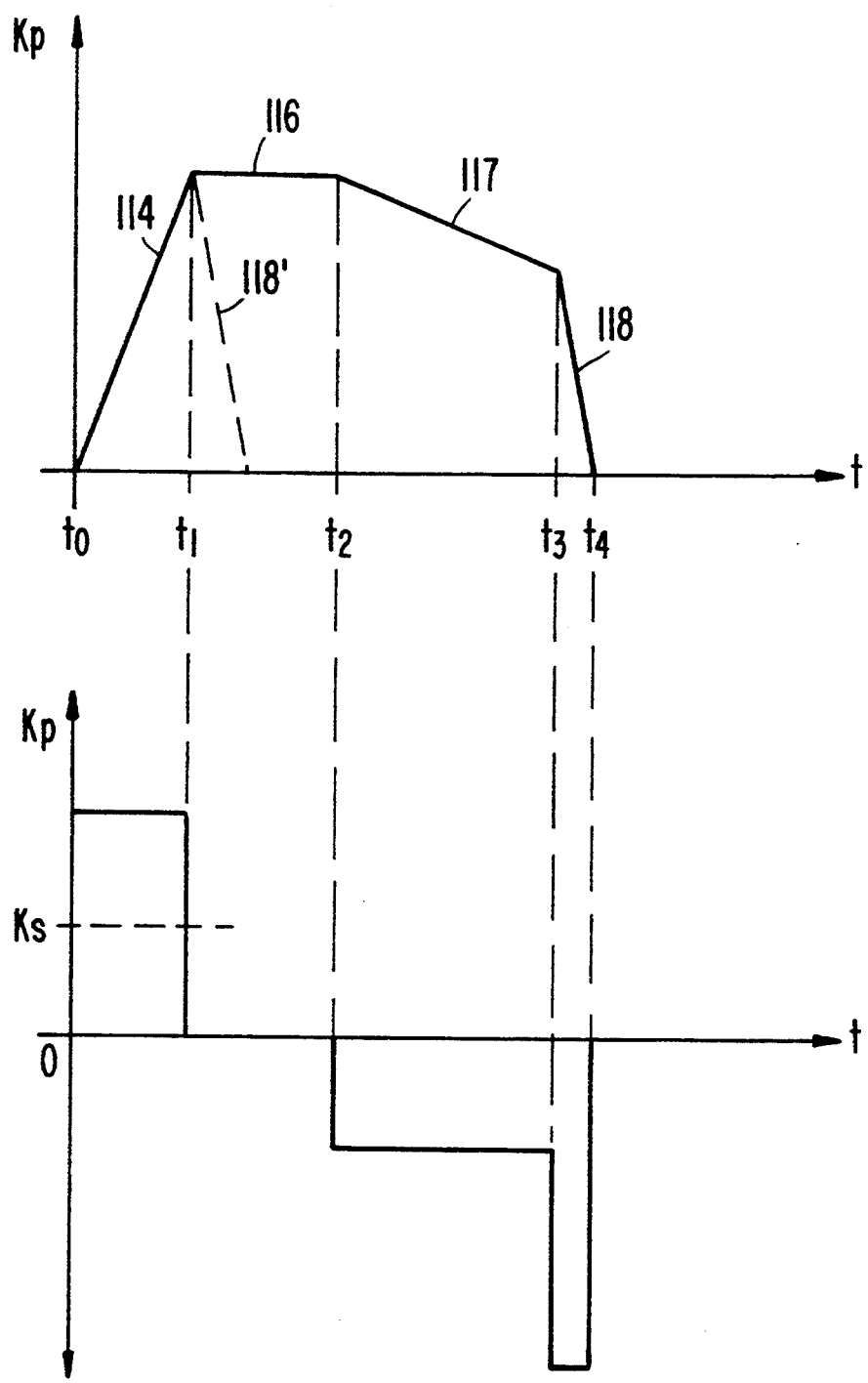
FIG. 1c are diagrams for explaining the embodiment in accordance with FIG. 1b.

For braking initiated at an instant $t_0$ and in the course of which the driver initially rapidly and uniformly increases the pedal force $K_p$ and holds the latter constant as soon as the value he desires for the vehicle deceleration is reached at the instant $t_1$, while the vehicle speed decreases more and more, and from the instant $t_2$ initially decreases the pedal force $K_b$ slowly at a uniform rate, and finally at the instant $t_3$ discontinues braking by "release"—rapid retraction—of the brake pedal 19, the brake pressure in the wheel brakes being completely removed at the instant $t_4$ following shortly thereafter, the result in qualitative terms is the temporal variation represented in the upper diagram in FIG. 1c, in the output signal of the force sensor 112 or 113. Specifically, the signal has a steeply rising branch 114 which corresponds to the increase in braking force, a "horizontal" section of constant signal level 116, a relatively flat falling branch 117 which corresponds to the controlled retraction of the pedal operating force, and a last branch 118 which falls steeply down to the signal level and results from the discontinuation of braking.

The variation, linked to this temporal variation in the force sensor output signal, in the temporal differential quotient $dK_p/dt$ of the force sensor output signal is represented in the lower diagram in FIG. 1c, and can be obtained by simple computational processing of the output signal levels of the force sensor 112 or 113. This differential quotient $\dot{K}_p$ reproduces by the sign ($\pm$) the sense of variation (increase/decrease) in the operating force, and the rate of variation by its magnitude. If, as in the selected explanatory example, the magnitude is higher at the start of braking than a prescribed threshold value $\check{K}_s$, this fact can be interpreted once again by the electronic control unit 36 as information to the effect that automatic full braking is necessary.

If, however, the driver wishes at the instant $t_1$ to discontinue the full braking already initiated at the instant $t_0$, with the consequence that starting from this instant the force sensor output signal follows the steeply falling branch 118' which starts at the instant $t_1$, is drawn in with dashes and extends parallel to the most steeply falling branch 118 of the upper diagram in FIG. 1c, this fact is detected virtually as early as the instant $t_1$ from the changing sign of the differential quotient $\check{K}_p$ and the high magnitude thereof, and is utilized to discontinue the controlled full braking.

In order to be able to increase the control point of the brake power assist unit 18 and thus also the braking force in the event of automatically controlled full braking, in accordance with the variant of the brake-pressure control device represented in FIG. 2a, it is possible if required for the output pressure of a compressed-air pump 106, which is increased with respect to atmospheric pressure and is approximately 2 bar in a typical design of the pump 106, to be coupled into the working pressure chamber 33 of the brake power assist unit 18. The pressure output of the pump 106 is connected to the pressure input 108 of the brake-pressure control valve 38, which is connected in the functional position II of the valve 38 to the working chamber 33 of the brake power assist unit 18, via a first check valve 107 which is subjected in the opening direction to a higher pressure at the pressure output of the pump 106 than in the working chamber 33, and is otherwise blocked. Furthermore, connected upstream of the pressure input 108 of the brake-pressure control valve 38 is a second check valve 107' which is pressurized in the opening direction when the pressure at the pressure input 108 is lower than atmospheric pressure, and is otherwise blocked. It is thus blocked when the pump 106 is working.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A brake-pressure control device for a road vehicle equipped with an antilock system which during a braking operation regulates dynamically stable deceleration behavior of the vehicle, having a hydraulic multiple circuit braking system configured such that wheel braking is effected by operation of a brake pedal, a braking device comprising a master cylinder having output pressure chambers individually assigned to brakes and a pneumatic brake power assist unit having a vacuum chamber connected to an intake stub of a vehicle engine and a working chamber configured to be subjected, via a control element operable by the brake pedal, to a pressure higher than a pressure prevailing at the intake stub, a sensor to detect a position of one of the brake pedal and an element motively coupled thereto and to generate electrical output signals characteristic of at least one of instantaneous position of the brake pedal and variations therein, and/or a force transmitter which generates output signals characteristic of a force with which a vehicle driver operates the brake pedal when braking, and an electronic control unit operatively associated with the sensor and/or the force transmitter such that, by processing signals from one of the sensor and the force transmitter, output signals are generated by the electronic control unit as drive signals for the brake-pressure control device so that, during a driving operation, a higher brake pressure than the brake pressure otherwise to be expected in accordance with the instantaneous pedal force can be coupled into said brakes, furthermore, driving of the brake-pressure control device for the purpose of increased brake-pressure deployment being triggered when at least one of a speed at which the brake pedal is operated for the purpose of a brake pressure build-up and a rate of variation of the force at which the vehicle driver operates the brake pedal is higher than a prescribed threshold value wherein the vacuum brake power assist unit includes a solenoid valve arrangement driven by one of the electrical output signals of the electronic control unit and movable from a basic position, in which a control duct of the control element, via which pressure compensation can be performed between the vacuum chamber and the working chamber of the vacuum brake power assist unit, is communicatingly connected to the vacuum chamber, whereas the working chamber of the vacuum brake power assist unit is blocked off from the outside atmosphere, into an excited functional position in which the control duct of the brake power assist unit is subjected to the ambient pressure via a flow path of the solenoid valve arrangement that is released in the functional position, whereas the control duct is blocked off from the vacuum chamber, the basic position of the solenoid valve arrangement being assigned to a non-operated state of the braking system and to a target braking operation thereof and the valve arrangement passing into its excited position when, during operation of the brake pedal, at least one of the threshold value of the speed of operation and the threshold value of the rate of variation of the operating force is overshot, and a valve is operatively associated to respond to the pressure in the control duct, is subjected to an opening direction to a relatively higher pressure in the control duct than in the working chamber and is otherwise blocked, and via which the control duct can be connected directly to the working chamber of the vacuum brake power assist unit.

2. The brake-pressure control device according to claim 1, wherein the valve, via which the control duct can be connected to the working chamber of the vacuum brake power assist unit, is a check valve.

3. The brake-pressure control device according to claim 2, wherein the check valve is a flutter valve configured to sealingly cover a discharge opening, of a transverse duct that extends from the control duct and opens into the working chamber, when the pressure in the working chamber is higher than in the control duct.

4. The brake-pressure control device according to claim 3, wherein the flutter valve is configured as an elastomeric lip which, under moderate biasing, covers the discharge opening of the transverse duct on the working chamber side.

5. The brake-pressure control device according to claim 1, wherein the control duct communicates with outside atmosphere via a flexible line and a bushing of the vacuum housing, and the solenoid valve is arranged in the space outside the vacuum chamber, in a basic position thereof connects said bushing to a second bushing leading back into the vacuum chamber, and, in an excited position thereof adopted during driving via at least one of the output signals generated by the electronic control unit overshooting the threshold value of the speed of operation of the brake pedal and upon overshooting of the threshold value of the rate of variation of the pedal operating force, blocks off the first bushing from the second bushing and when the rate of the variation of the force becomes lower than the threshold value of the rate of variation of the pedal operating force, connects the latter to the outside atmosphere.

6. The brake-pressure control device according to claim 5, wherein the brake-pressure control valve is a 3/3 way valve which, via the output signals of the electronic control unit by at least one of a defined value of control current upon overshooting of the threshold value of the speed of operation of the brake pedal and upon overshooting of the threshold value of the rate of variation of the pedal operating force, can be switched over into its excited position, and by means of an output signal of defined different, lower current strengths into an excited blocked position in which the control duct is blocked off both from the vacuum chamber and from the working chamber.

7. The brake-pressure control device according to claim 1, wherein the working chamber of the brake power assist unit is configured and arranged to be subjected to a higher pressure than the atmospheric ambient pressure.

8. The brake-pressure control device according to claim 7, wherein the higher pressure utilized to pressurize the working chamber of the brake power assist unit has a magnitude between 1.5 and 2.5 bars.

9. The brake-pressure control device according to claim 8, wherein the higher pressure is 2 bars.

10. The brake-pressure control device according to claim 7, wherein a compressed-air pump is provided with a pressure outlet for the provision of the higher pressure is connected to an input of a brake-pressure control valve, which input is connected to the working chamber of the brake power assist unit during full braking, via a first check valve which, in an opening direction, is subjected to relatively higher pressure at the pressure outlet of the pump than in the working chamber and is otherwise blocked, and a further check valve is connected to said inlet of the brake-pressure control valve so that in the event of pressure which is relatively higher than atmospheric pressure at the pressure inlet of the brake-pressure control valve said further check valve is blocked but is otherwise open.

11. The brake-pressure control device according to claim 10, wherein the higher pressure utilized to pressurize the working chamber of the brake power assist unit has a magnitude between 1.5 and 2.5 bars.

12. The brake-pressure control device according to claim 11, wherein the higher pressure is 2 bars.

* * * * *